(12) United States Patent
Eskander

(10) Patent No.: US 10,254,909 B2
(45) Date of Patent: Apr. 9, 2019

(54) SYSTEM AND METHOD FOR PROVIDING A USER INTERFACE FOR MEDIA NAVIGATION BY ATTRIBUTE COMPASS

(75) Inventor: Tamer Safwat Aziz Eskander, North Hollywood, CA (US)

(73) Assignee: Disney Enterprises, Inc., Burbank, CA (US)

(*) Notice: Subject to any disclaimer, the term of this patent is extended or adjusted under 35 U.S.C. 154(b) by 1202 days.

(21) Appl. No.: 13/251,484

(22) Filed: Oct. 3, 2011

(65) Prior Publication Data

US 2013/0086498 A1    Apr. 4, 2013

(51) Int. Cl.
*G06F 3/0481* (2013.01)
*G06F 17/30* (2006.01)

(52) U.S. Cl.
CPC ................................ *G06F 3/0481* (2013.01)

(58) Field of Classification Search
CPC ..................... G06F 3/0481; G06F 17/30696
USPC ............................................. 715/765, 854
See application file for complete search history.

(56) References Cited

U.S. PATENT DOCUMENTS

| 6,333,752 | B1* | 12/2001 | Hasegawa et al. | 715/764 |
| 8,171,049 | B2* | 5/2012 | Ah-Pine | G06F 17/30572 707/723 |
| 8,230,360 | B2* | 7/2012 | Ma | G06F 3/0482 715/788 |
| 2005/0091596 | A1* | 4/2005 | Anthony | G06F 3/04815 715/712 |
| 2006/0155684 | A1* | 7/2006 | Liu et al. | 707/3 |
| 2007/0028268 | A1* | 2/2007 | Ostojic | G06F 3/0482 725/52 |
| 2008/0320515 | A1* | 12/2008 | Sloo | H04N 5/44543 725/39 |
| 2011/0055725 | A1* | 3/2011 | Folgner | G06F 3/0486 715/753 |
| 2012/0260291 | A1* | 10/2012 | Wood | 725/45 |

\* cited by examiner

*Primary Examiner* — Stephen S Hong
*Assistant Examiner* — Nicholas Hasty
(74) *Attorney, Agent, or Firm* — Farjami & Farjami LLP

(57) ABSTRACT

There is provided a system and method for providing a user interface for media navigation by attribute compass. The system comprises a processor configured to show, on a display, a grid view of a plurality of media items. The processor is further configured to present, on the display, a plurality of attribute compasses associated with the media item selected from the plurality of media items, designate the selected media item as a pivot item upon receiving a selection of an attribute compass from the plurality of attribute compasses, the attribute compass comprising a positive correlation between a direction and an attribute, and arrange the grid view according to the positive correlation of the attribute compass. By presenting the user with a grid view and a plurality of attribute compasses, the user may intuitively and continuously navigate towards the direction containing media items with relevant attributes.

18 Claims, 6 Drawing Sheets

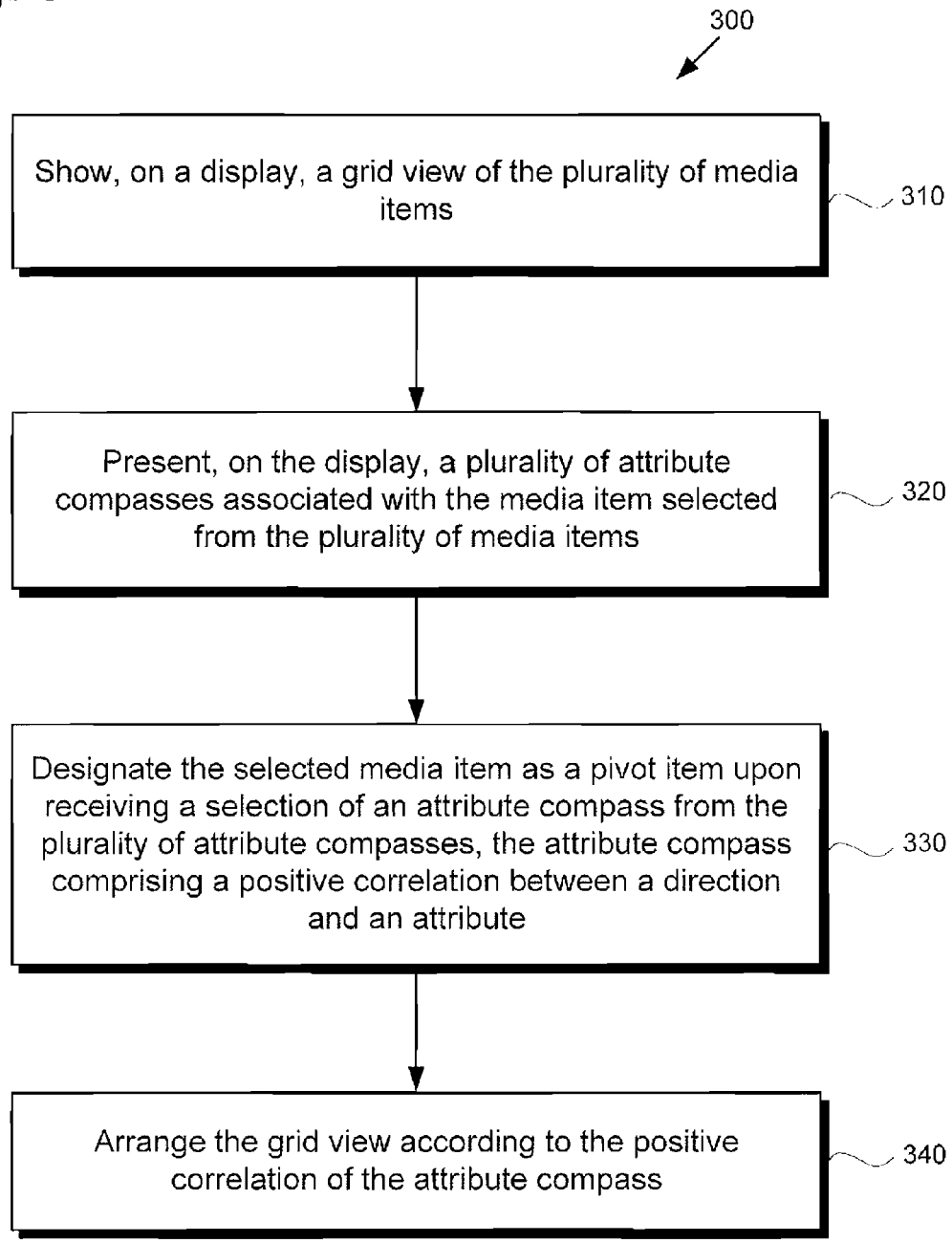

SYSTEM AND METHOD FOR PROVIDING A USER INTERFACE FOR MEDIA NAVIGATION BY ATTRIBUTE COMPASS

BACKGROUND OF THE INVENTION

1. Field of the Invention

The present invention relates generally to user interfaces. More particularly, the present invention relates to providing a user interface for facilitated media navigation.

2. Background Art

Content providers are constantly seeking to improve the accuracy and relevance of selections presented to consumers in response to media searches. However, given the ever increasing quantity of media data to search through, delivering relevant media selections becomes increasingly difficult. To assist in finding media of interest, conventional media search interfaces may allow users to specify multiple categories and/or keywords for narrowing down a search.

However, these conventional search methods often require significant effort from the user in the selection of specific categories, the entry of search terms, and the waiting time required to update the interface and search results between each narrowing step. Additionally, the establishment of rigid categories often prevents users from discovering the wider spectrum of relevant selections that may be available. For example, a user might be given the choice of selecting a comedy or an action genre, but the user might be interested in media having elements of comedy and action in various proportions. Moreover, because conventional interfaces typically list search results as a sequential list spanning multiple pages, a user may be required to browse through several pages of results before finding an item of interest. The dilemma of choices and the difficulty in navigation may deter many users from accessing any media content at all, particularly those with limited leisure time and patience for complicated search interfaces.

Accordingly, there is a need to overcome the drawbacks and deficiencies in the art by providing a user interface for facilitated media navigation to quickly and easily find media of interest.

SUMMARY OF THE INVENTION

There is provided systems and methods for providing a user interface for media navigation by attribute compass, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing the steps, according to one embodiment of the invention, by which a user interface for media navigation by attribute compass may be provided, according to one embodiment of the present invention.

DETAILED DESCRIPTION OF THE INVENTION

The present application is directed to a system and method for providing a user interface for media navigation by attribute compass. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
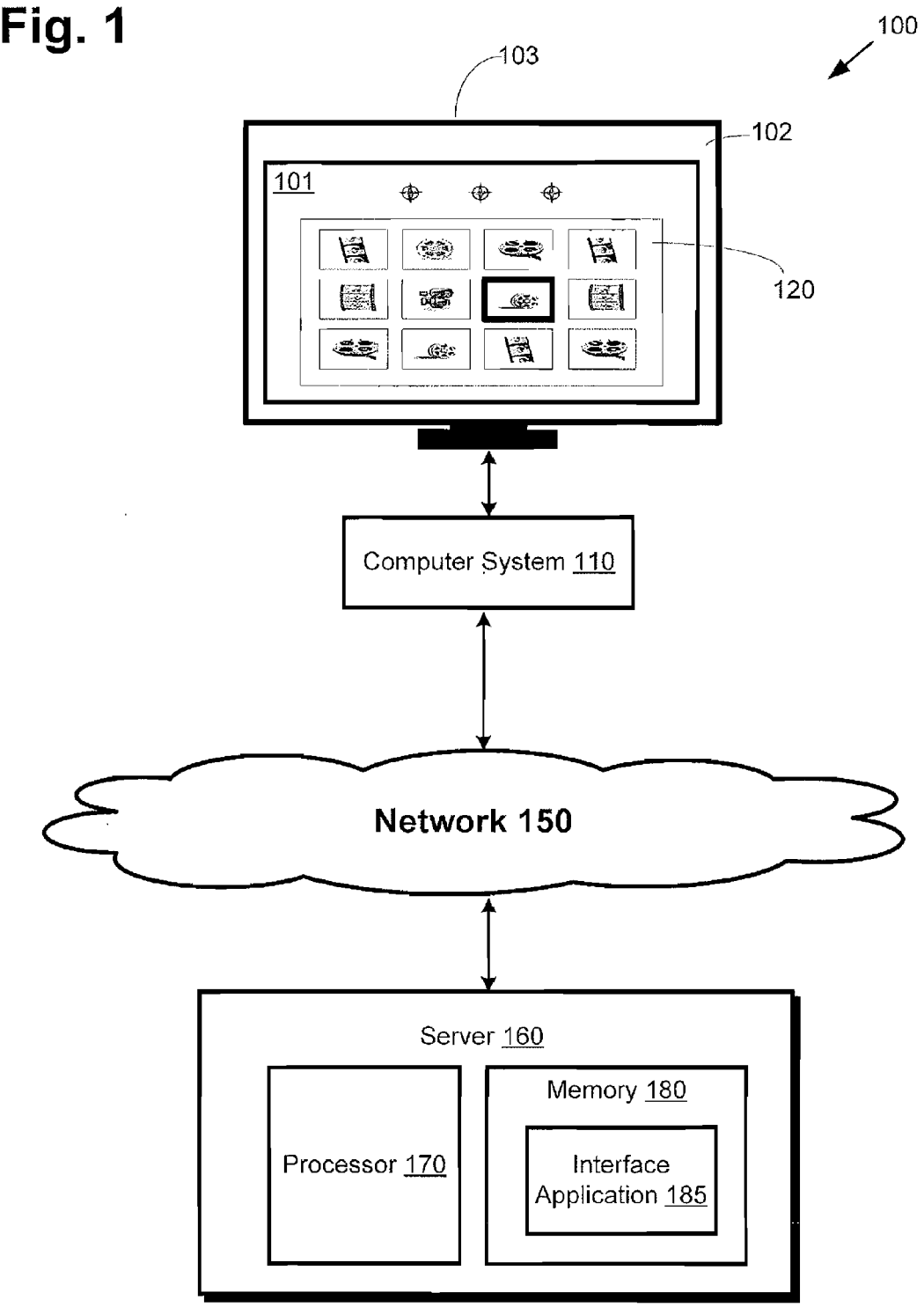
FIG. 1 presents a system for providing a user interface for media navigation by attribute compass, according to one embodiment of the present invention.

FIG. 1 presents a system for providing a user interface for media navigation by attribute compass, according to one embodiment of the present invention. System 100 includes computing device 110 and display monitor 103 having a display 102. Computing device 110 may be any type of computer hardware having volatile memory, data storage hardware, and processor. Computing device 110 may be connected to various display devices, such as display monitor 103, and various input devices, such as a mouse, a remote control, or a touch screen. Display monitor 103 may comprise any type of monitor such as a liquid crystal display (LCD) monitor or any other type of display device. In FIG. 1, display monitor 103 is connected to computing device 110. In other embodiments, display monitor 103 and computing device 110 may be physically integrated into a single device, such as a smartphone, a tablet PC, a laptop, or any other portable computing device, for example. Display monitor 103 includes display 102. Display 102 may comprise a touch sensitive monitor screen. In alternative embodiments, display 102 may comprise any type of monitor screen. User interface 101 may be a specialized graphical user interface providing navigation through a plurality of media items. User interface 101 may present grid view 120. Grid view 120 may be a window area for presenting a plurality of media items. Grid view 120 may allow a user to navigate through the plurality of media items by scrolling horizontally towards the left or right directions within grid view 120. In alternative embodiments, grid view 120 may allow navigation in other directions and in multiple axes.

Network 150 may comprise any type of network such as the Internet. Computing device 110 may connect to server 160 across network 150 in order to present user interface 101 on display 102. Memory 180 may be any type of volatile or non-volatile machine medium capable of storing data related to the plurality of media items displayed on user interface 101. Memory 180 includes interface application 185. Server 160 may comprise any type of server capable of storing and processing data. In one embodiment, server 160 may be a web or application server dedicated to selling or streaming movies, music, or other entertainment media to online customers through network 150. Processor 170 may comprise any type of processor such as a central processing unit (CPU).

In FIG. 1, user interface 101 may be presented through a web browser such as Mozilla Foundation's Firefox, Microsoft's Internet Explorer, Google's Chrome, or Apple's Safari, for example. In alternative embodiments, user interface 101 may be generated on display 102 by interface application 185 executing on server 160. In other embodiments, interface application 185 and the media items in memory 180 may be stored in computing device 110 and executed within computing device 110 in order to present user interface 101 on display 102, thereby obviating a need to access network 150. Interface application 185 is executed to arrange media contents into various arrangements within user interface 101, as will be described in detail further below.

Figure 2A:
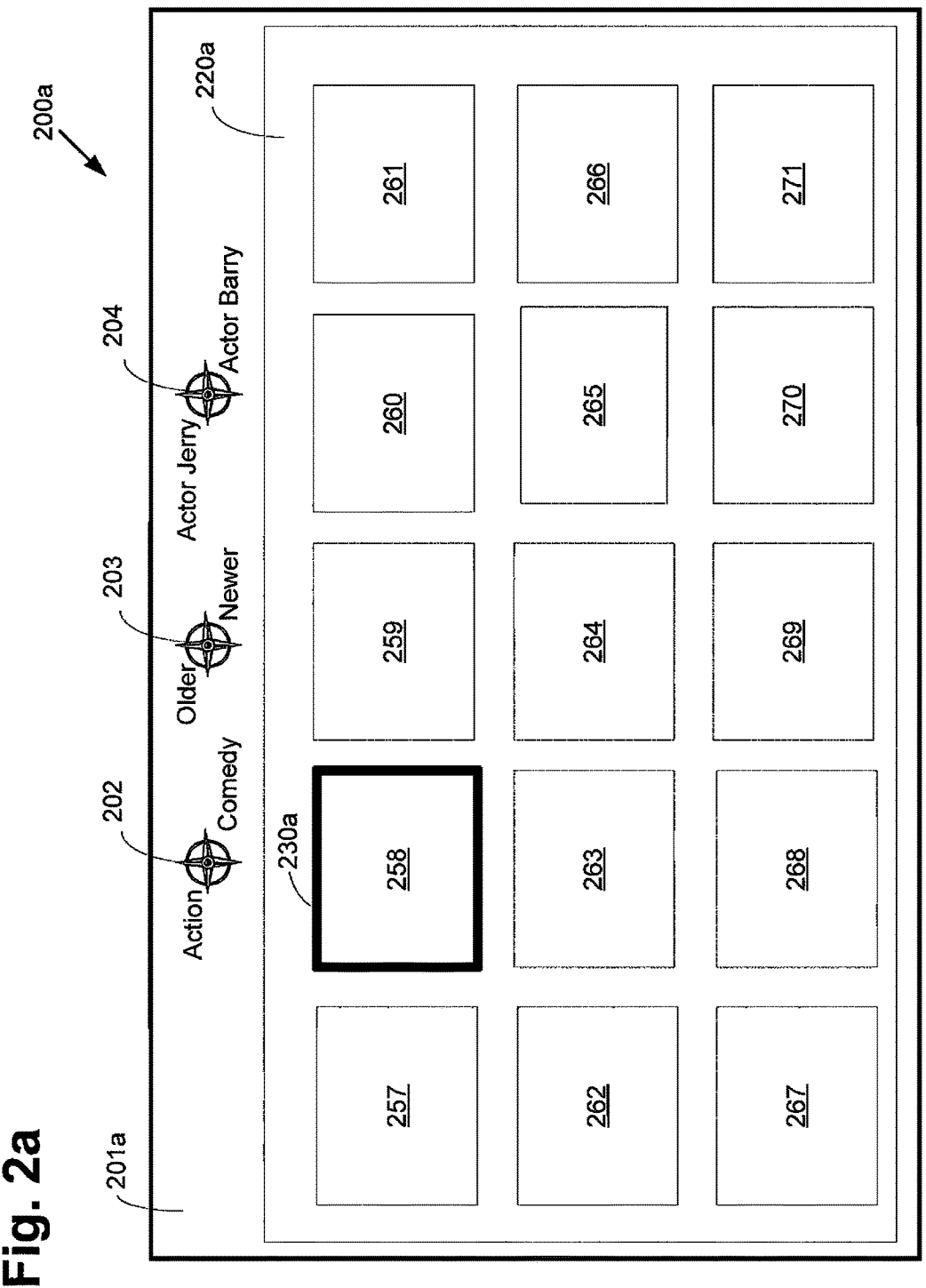
FIG. 2a presents a diagram of an initial user interface for media navigation by attribute compass, according to one embodiment of the present invention.

FIG. 2a presents a diagram of an initial user interface for media navigation by attribute compass, according to one embodiment of the present invention. FIG. 2a includes diagram 200a. Diagram 200a includes user interface 201a, which may be any type of graphical user interface. User interface 201a includes a plurality of attribute compasses 202, 203, and 204, which may comprise graphical icons. User interface 201a further includes grid view 220a, which may be any type of graphical window such as a scrolling window. User interface 201a and grid view 220a may correspond to user interface 101 and grid view 120 of FIG. 1, respectively. Processor 170 of FIG. 1 may be configured to show, on display 102 of FIG. 1, grid view 220a of the plurality of media items 257-271.

Grid view 220a shows a plurality of media items including media items 257, 258, 259, 260, 261, 262, 263, 264, 265, 266, 267, 268, 269, 270 and 271, and media item highlight 230a surrounding media item 258. In FIG. 2a, each of media items 257-271 may be a graphical icon associated with a movie and media item highlight 230a may comprise a graphical border. While only media items 257-271 are displayed in grid view 220a, additional media items may also be accessible through navigation of grid view 220a. Grid view 220a may be resized to include more media items, and the media items, including media items 257-271, may also be resized to allow more media items to fit into grid view 220a. A user may navigate to additional media items not presently shown in grid view 220a by moving media item highlight 230a horizontally towards the left or right of grid view 220a. In other embodiments, a user may scroll in other directions or multiple axes within grid view 220a, for example vertically or both vertically and horizontally.

Grid view 220a may comprise an M by N ("M×N") matrix with M rows and N columns for presenting media items 257-271. For example, in FIG. 2a, media items 257-271 may be presented as a 3×5 matrix within grid view 220a. In other embodiments, grid view 220a, as explained earlier, may be resized. Grid view 220a may initially display randomly selected media items 257-271 since no pivot item is designated. The designation of a pivot item will be explained in detail in the description of FIG. 2b. However, in alternative embodiments, a default selection of recommended media items may be presented to the user based on a user history or user profile, as known in the art. As stated earlier, each of the plurality of media items 257-271 in FIG. 2a may be a graphical icon associated with a particular movie. User interface 201a may be presented for the purpose of purchasing movies associated with each of media items 257-271. In other embodiments, user interface 201a may be presented for online streaming of digital media or for other entertainment, commercial, or academic purposes. Therefore, each of the plurality of media items, including media items 257-271, may be associated with a music file, a graphical file, a software file, or any other type of digital media. In yet other embodiments, the plurality of media items, including media items 257-271, may be associated with websites, products, or other items.

Figure 2B:
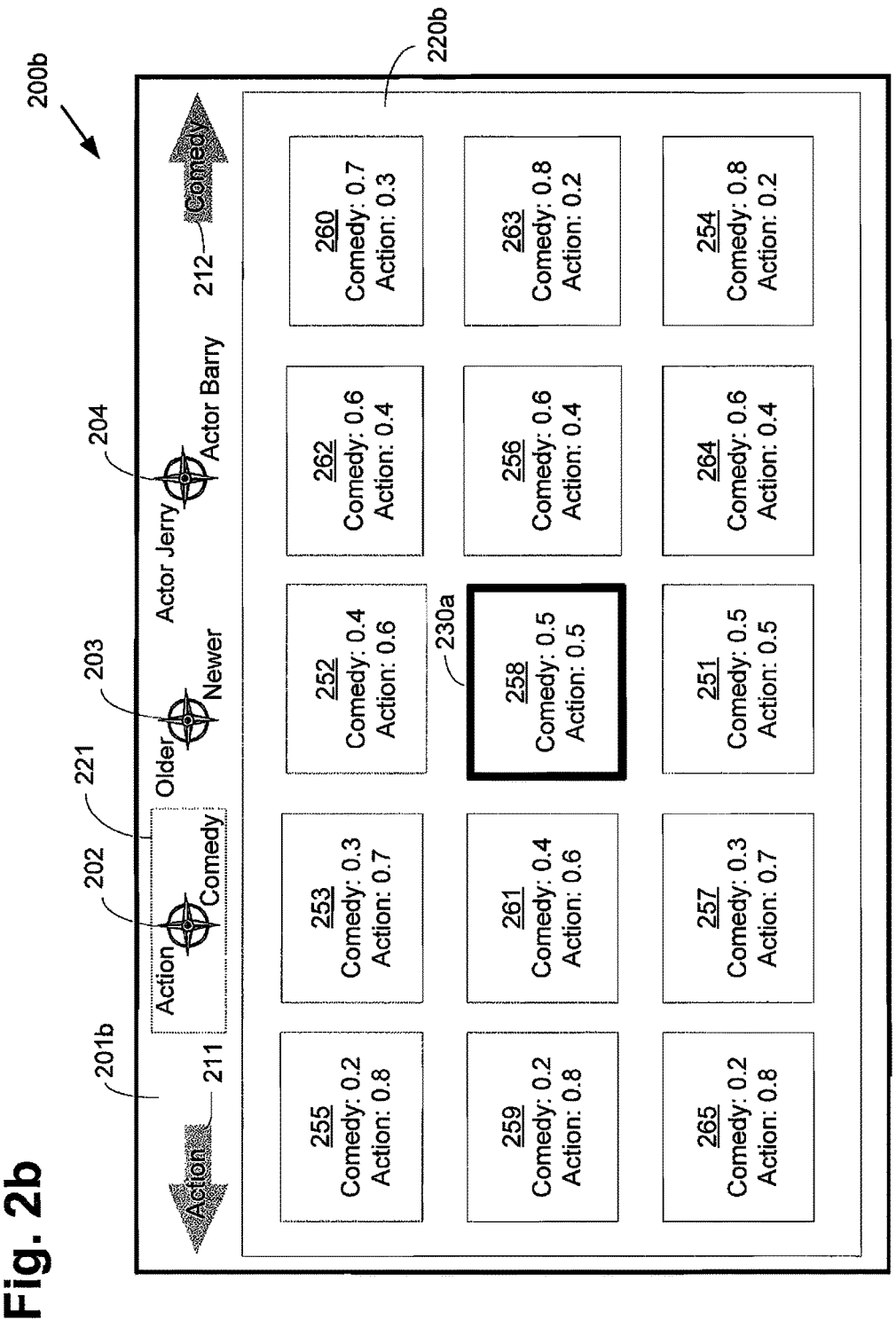
FIG. 2b presents a diagram of the user interface of FIG. 2a after designating a pivot item, according to one embodiment of the present invention.

In one embodiment of the invention as shown in FIG. 2a, each of the plurality of media items, including media items 257-271, may be associated with a unique movie and may also be associated with a set of attribute scores corresponding to various attributes of the associated unique film, as further described in the description of FIG. 2b. In one embodiment, the set of attribute scores of each of the plurality of media items 257-271 may be determined within server 160 and stored within memory 180 of FIG. 1. Alternatively, the set of attribute scores may also be stored within computing device 110 of FIG. 1.

Grid view 220a presenting media items 257-271 may be shown upon initial presentation of user interface 201a. Server 160 of FIG. 1 may initially present media items 257-271. Moreover, processor 170 may be configured to randomly select any of the plurality of media items 257-271 by placing media item highlight 230a on that media item. In FIG. 2a, media item highlight 230a is placed on media item 258 indicating a selection of media item 258. Media item highlight 230a may be moved to other media items through an external input device or through touch-sensitive display 102 of FIG. 1. Processor 170 may be configured to present, on display 102, a plurality of attribute compasses 202, 203, and 204 associated with the media item 258, which is presently selected from media items 257-271. Each of the plurality of media items, including media items 257-271, may have one or more associated attribute compasses. Each attribute compass may be associated with one or more attributes. The attribute compasses may be stored within memory 180.

While media item 258 is selected in FIG. 2a, media item 258 is not designated as a pivot item. While no pivot item is initially designated in FIG. 2a, in alternative embodiments, processor 170 may be configured to initially designate a pivot item based on an initial user selection, a default selection set in a user profile used to access user interface 201a, a selection based on prior user selections, a recommendation engine selection, or any other methods programmed into server 160. Pivot items shall be described below in conjunction with FIG. 2b.

FIG. 2b presents a diagram of the user interface of FIG. 2a after designation of a pivot item, according to one embodiment of the present invention. User interface 201b includes attribute compasses 202, 203, and 204, selected compass highlight 221, left arrow 211, right arrow 212, and grid view 220b. Grid view 220b includes a plurality of media items 251-265 presented in a 3×5 matrix with 3 rows and 5 columns. Grid view 220b further includes media item highlight 230a. User interface 201b and grid view 220b may correspond to user interface 101 and grid view 120 of FIG. 1, respectively.

Processor 170 of FIG. 1 may be configured to designate selected media item 258 as a pivot item upon receiving a selection of attribute compass 202 from the plurality of attribute compasses 202, 203, and 204, with attribute compass 202 comprising one or more positive correlations between a direction and an attribute. A user may select attribute compass 202 by using the touch-sensitive input capabilities of display 102 of FIG. 1 or other input devices. After designating media item 258 as the pivot item, processor 170 may be configured to arrange grid view 220b according to the pair of positive correlations indicated by attribute compass 202. In one embodiment, the arrangement of the plurality of media items 251-265 may comprise initially placing the pivot item, media item 258, at the center of grid view 220b.

Attribute compass 202 may be selected in order to arrange the plurality of media items based on an action attribute score and a comedy attribute score. More specifically, attribute compass 202 comprises a positive correlation between the comedy attribute and the right direction of grid view 220b, and a positive correlation between the action attribute and the left direction of grid view 220b. In other words, the plurality of media items is arranged such that media items to the right direction of pivot item, media item 258, are in increasing comedy attribute scores with respect to media item 258. The media items to the left direction of media item 258 are arranged in decreasing comedy attribute scores with respect to media item 258. Furthermore, media items towards the left direction of media item 258 are arranged in increasing action attribute scores with respect to media item 258, and media items to the right of media item 258 are arranged in decreasing action attribute scores with respect to media item 258.

For example, after selecting attribute compass 202, media item 256 with a comedy attribute score of 0.6 is placed to the right of media item 258 since media item 256 has a greater comedy attribute score than media item 258. Similarly, media item 260 with a comedy attribute score of 0.7 is placed to the right of media item 256 since media item 260 has a greater comedy attribute score than media item 256. The attribute scores may correspond to a weighting of the attribute for a particular associated media item. After arranging grid view 220b based on the positive correlations indicated by the selected attribute compasses, in one embodiment, the difference in attribute scores of a media item to a pivot item may be proportional, linear or otherwise, to the distance between that media item and the pivot item.

As stated earlier, attribute compass 202 may include a positive correlation between the action genre attribute and the left direction. For example, media item 258 has an action attribute score of 0.5. Media item 261 is placed to the left of media item 258 because media item 261 has an action attribute score of 0.6. Similarly, media item 265 with an action attribute score of 0.8 is placed to the left of media item 261. Left arrow 211 and right arrow 212 are presented on user interface 201c in order to indicate the positive correlations of attributes and directions for selected attribute compass 202. As previously described, attribute compass 202 in FIG. 2b creates two positive correlations in opposite directions, the left direction and the right direction. In alternative embodiments, the two opposite directions may be opposite vertical directions or opposite diagonal directions, as well. However, attribute compasses are not necessarily limited to pairs of opposing directions and may also present only a single positive correlation of an attribute to a single direction. In yet other embodiments, an attribute compass may present multiple positive correlations of attributes to multiple directions or axes.

As previously stated, in one embodiment, each of media items 251-265 may be associated with a movie and each of media items 251-265 may be associated with a set of attributes scores. The plurality of media items, including media items 251-265, may have a common set of attribute scores. The determination of the associated attribute scores may be established in server 160. Attribute scores may indicate the degree of correlation between the media item and that attribute. For example, media item 258 has an action attribute score of 0.5 and a comedy attribute score of 0.5, indicating that the movie associated with media item 263 has relatively average of levels of comedy and average levels of action. Media item 258 may also have a release date attribute number and attribute scores for various actors associated with media item 258. As described earlier, an attribute score may indicate how strongly media item 258 possesses the attribute, but other attribute values such as a date value may simply be a value directly corresponding to the release date of the film associated with the media item. Media items 251-257 and media items 259-265 may thus have associated attribute scores for various properties including genre attributes such as comedy levels, action levels, drama and suspense levels. Other properties, such as actor presence, may indicate the frequency of screen time for particular actors or characters in a particular media work. Other metadata such as date of release, associated studio, associated director, and many other associated properties may also be utilized as the basis for attribute scores.

An attribute compass may also comprise positive correlations with opposite attributes in opposite directions. For example, the unselected attribute compass 203 may comprise a positive correlation of films newer than the pivot item, media item 258, towards a right direction of media item 258, and a positive correlation of films older than media item 258 towards the left direction of media item 258. The attribute scores of media items 251-265 may be determined within memory 180.

In another example, the unselected attribute compass 204 may comprise a pair of positive correlations for actor "Barry" and the right direction and for actor "Jerry" and the left direction. In other embodiments, the two attributes of a positive correlation may comprise a pair of movie genres, a pair of movie production studios, a pair of movie writers, a pair of musicians, a pair of graphical artists, or any other pair of attributes that may be a part of the metadata of the film associated with the media item, as previously discussed.

Figure 2C:
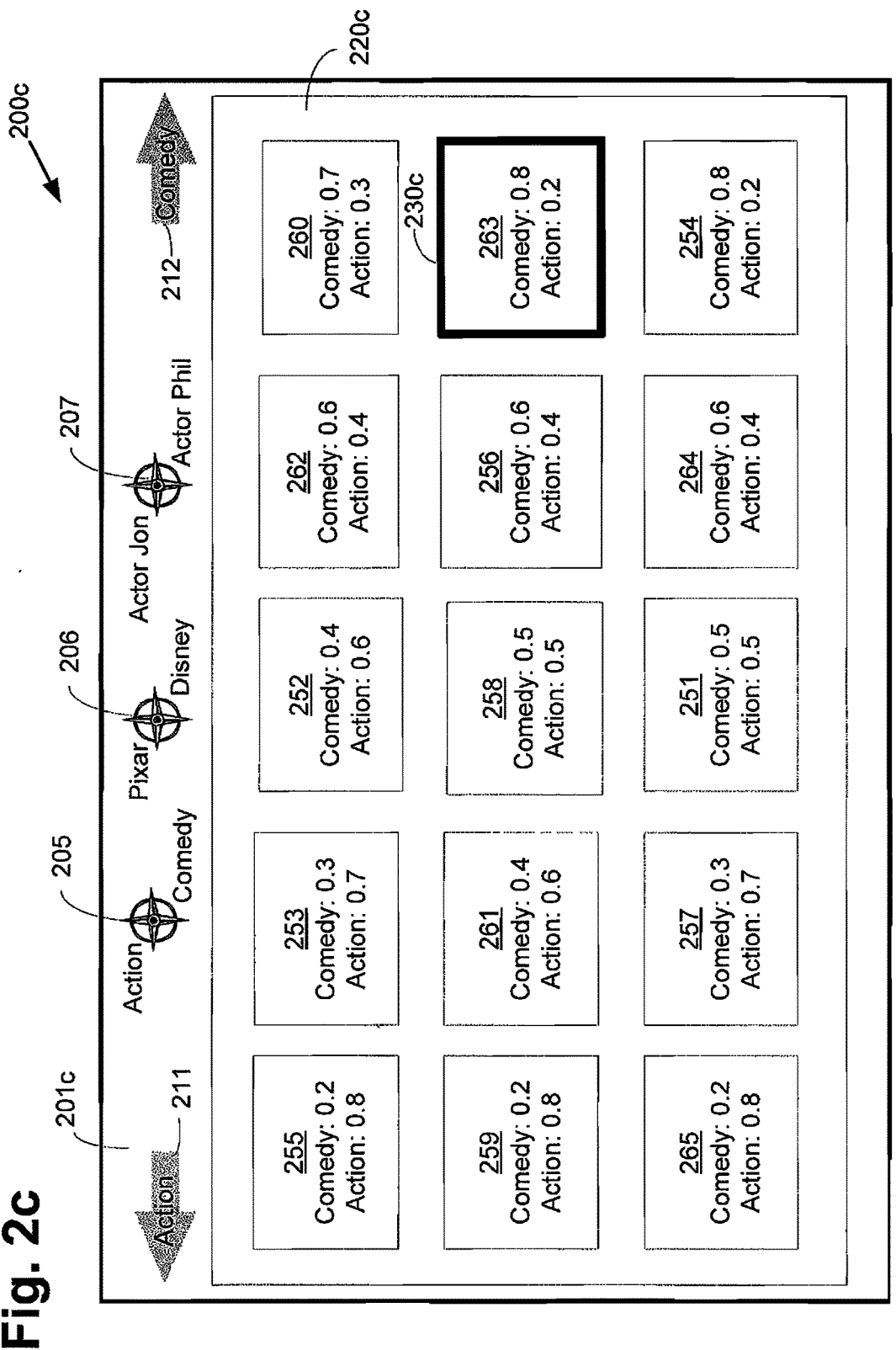
FIG. 2c presents a diagram of the user interface of FIG. 2b after a user selects another media item, according to one embodiment of the present invention.

FIG. 2c presents a diagram of the user interface of FIG. 2b after a user selects another media item, according to one embodiment of the present invention. FIG. 2c includes diagram 200c. Diagram 200c includes user interface 201c. User interface 201c includes a plurality of attribute compasses 205, 206, and 207, left arrow 211, right arrow 212, and grid view 220c. Grid view 220c includes media items 251, 252, 253, 254, 255, 256, 257, 258, 259, 260, 261, 262, 263, 264, and 265, and media item highlight 230c. User interface 201c and grid view 220c may correspond to user interface 101 and grid view 120 of FIG. 1, respectively. Media item highlight 230c may correspond to media item highlight 230a of FIG. 2a. Attribute compass 205 may correspond to attribute compass 202 of FIG. 2a.

After selecting a pivot item, media item 258, the user may navigate through the plurality of media items 251-265 and select another media item, media item 263, as indicated by media item highlight 230c. Processor 170 of FIG. 1 may be configured to present, on display 102, another plurality of attribute compasses 205, 206 and 207 associated with media item 263 selected from the plurality of media items 251-265. Additionally, although not shown in FIG. 2c, grid view 220c may also be configured to re-center the view around selected media item 263, thereby scrolling the view to the right until media item 263 is in the center where media item 258 was previously.

As previously explained, each of media items 251-265 may be associated with one or more attribute compasses. By selecting media item 263, another set of attribute compasses 205, 206 and 207 may be presented on user interface 201c. Media item 263 has attribute compasses 206 and 207 which may not be attribute compasses for media item 258. Media item 263 does not have attribute compasses 203 and 204 of FIG. 2b, which are both attribute compasses for media item 258. However, media items within grid view 220c may all have media compass 205, which corresponds to attribute compass 202 of FIG. 2b which was selected in FIG. 2b in order to designate media item 258 as the pivot item. Accordingly, various attribute compasses may be shown to the user that are dynamically updated and contextually relevant to a particular selected media of interest, allowing a user to readily find related media by selecting attribute compasses related to the interests of the user.

Figure 2D:
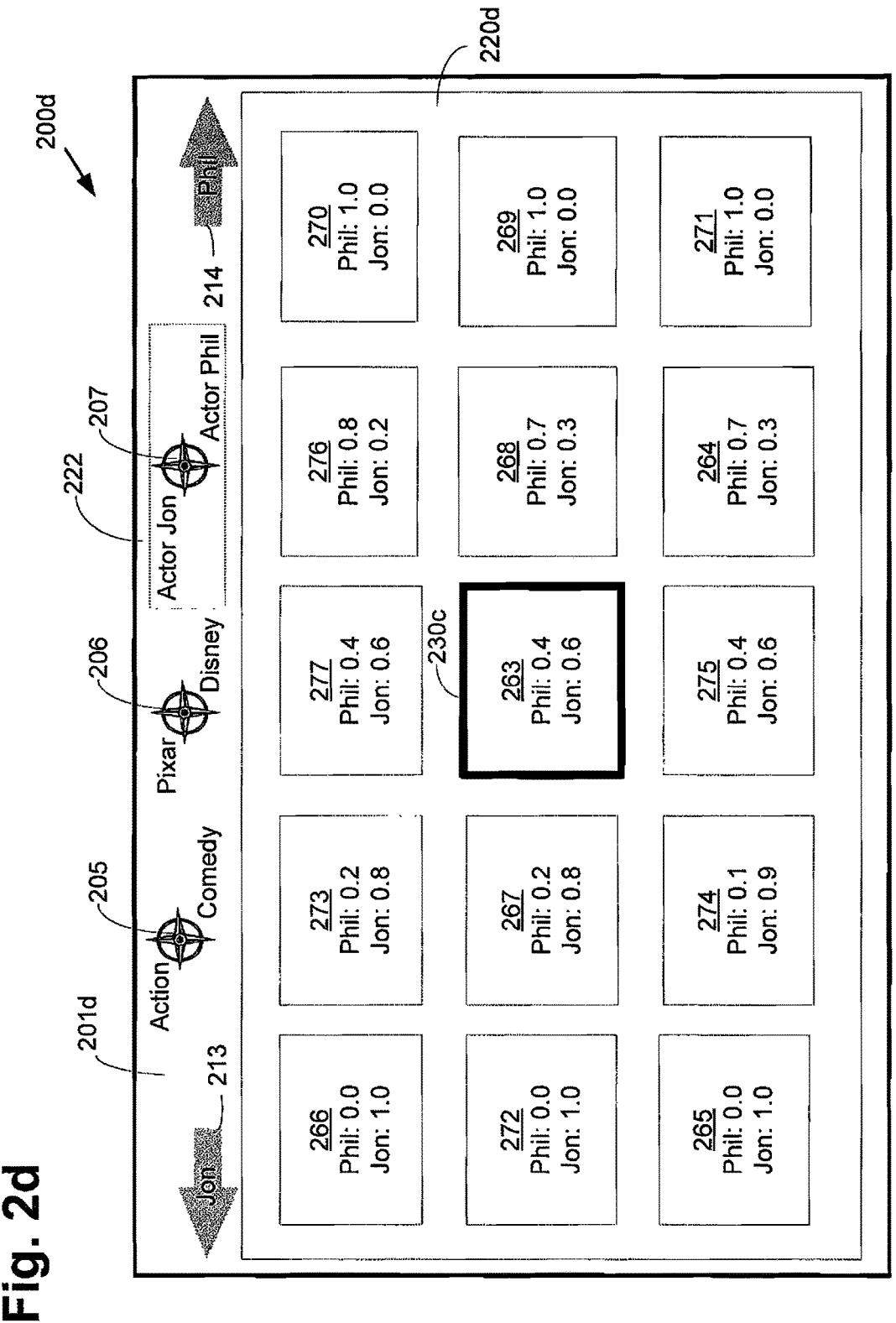
FIG. 2d presents a diagram of the user interface of FIG. 2c after designating another pivot item, according to one embodiment of the present invention.

FIG. 2d presents a diagram of the user interface of FIG. 2c after designating another pivot item, according to one embodiment of the present invention. FIG. 2d includes diagram 200d. Diagram 200d includes user interface 201d. User interface 201d includes attribute compasses 205, 206, and 207, selected compass highlight 222, left arrow 213, right arrow 214, and grid view 220d. Grid view 220d includes media items 263, 264, 265, 266, 267, 268, 269, 270, 271, 272, 273, 274, 275, 276, and –277 and media item highlight 230c. User interface 201d and grid view 220d may correspond to user interface 101 and grid view 120 of FIG. 1, respectively.

After receiving a selection of another media item, media item 263, in FIG. 2c, processor 170 of FIG. 1 may be configured to designate another media item 263 as the pivot item upon receiving a selection of another attribute compass 206 selected from another plurality of attribute compasses 205, 206, and 207, for example in response to a user selection. Attribute compass 207 comprises positive correlations between directions and actor attributes. Attribute compass 207 has been selected as indicated by selected compass highlight 222. Processor 170 may then be configured to arrange grid view 220d according to the positive correlations of another attribute compass 207, and to center media item 263 in grid view 220d.

Attribute compass 205 may comprise a pair of actor attributes for actors "Jon" and "Phil". Each of media items 263-277 may have an associated attribute score for Jon and Phil between 0.0 and 1.0. Attribute compass 207 may comprise a positive correlation between the actor attribute Phil and the right direction. Thus, media items towards the right direction media item 263 may be arranged in increasing Phil attribute scores. For example, media item 268 is further to the right of media item 263 because media item 268 has a Phil attribute score of 0.7 as compared to the Phil attribute score of 0.4 for media item 263. The greater the Phil attribute score, the more Phil may be shown in the actual film associated with that media item. Conversely, the lesser the Phil attribute score, the less Phil may be shown in the film.

Attribute compass 207 further comprises a positive correlation between the Jon attribute and the left direction. Thus, media items to the left of media item 263 are arranged with increasing Jon attribute scores. For example, media item 267 has a Jon attribute score of 0.8, which is greater than the Jon attribute score of 0.6 of media item 263. Thus, media item 267 is placed to the left of media item 263. In another example, media item 265 has a Jon attribute score of 1.0, which is greater than the Jon attribute score of 0.8 of media item 267. Thus, media item 265 is placed to the left of media item 267.

In the descriptions for FIGS. 2b, 2c, and 2d, grid views 220b, 220c, and 200d are arranged according to the positive correlations of a single attribute compass of the pivot item. In alternative embodiments, a plurality of attribute compasses associated with a pivot item may be selected simultaneously to arrange the plurality of media items. Grid view may be arranged according to the combined positive correlations. For example, in FIG. 2d, after receiving a selection of attribute compass 206, processor 170 may be configured to receive, in response to another selection by the user, another attribute compass 202 comprising another positive correlation between a direction and another attribute. Then processor 170 may be configured to rearrange grid view 220d according to the positive correlations of attribute compass 206 and attribute compass 202. For example, the plurality of media items presented on grid view 220d may be arranged such that the attribute scores for actor Phil and comedy genre may gradually increase in the right direction with respect to pivot item, media item 263. Likewise, the attribute scores for action genre and actor Jon of the rearranged media items in grid view 220d may gradually increase in the left direction with respect to media item 263. In yet another embodiment, the user may flip compass 206 around the vertical axis so that the Jon attribute is associated with the right direction and the Phil attribute is associated with the left direction. In further embodiments, the user may be allowed to assign correlations to specific user defined directions or to create custom attribute compasses if the default associated attribute compasses are not satisfactory to the user.

FIG. 3 shows a flowchart describing the steps, according to one embodiment of the invention, by which a user interface for media navigation by attribute compass may be provided, according to one embodiment of the present invention. Certain details and features have been left out of flowchart 300 that are apparent to a person of ordinary skill in the art. Thus, a step may comprise one or more sub-steps or may involve specialized equipment or materials, for example, as known the art. While steps 310 through 340 indicated in flowchart 300 are sufficient to describe one embodiment of the present method, other embodiments may utilize steps different from those shown in flowchart 300, or may include more, or fewer steps.

Referring to step 310 of flowchart 300 in FIG. 3, system 100 of FIG. 1, and diagram 200a of FIG. 2a, step 310 of flowchart 300 comprises processor 170 configured to show, on display 102, a grid view 220a of a plurality of media items 257-271. User interface 201a may be shown on display 102 as the user interface of an executing applet, service, or application. In other embodiments, user interface 201a may be within a web browser or other types of browser pop-ups. Media items 257-271 may be transmitted from server 160 into user interface 201a for presentation and selection. Media items 257-271 may be graphical icons associated with movies, music files, graphical files, software programs, or any other type of items. In one embodiment, any of media items 257-271 may be selected to launch the associated movie. In another embodiment, any of media items 257-271 may be a product such as a book, and any of media items 257-271 may be selected to enable the user to make a purchase of that media item. In yet another embodiment, any of media items 257-271 may be a web site, and any of media items 257-271 may be selected to launch the web site from a web browser.

Referring to step 320 of flowchart 300 in FIG. 3, system 100 of FIG. 1, diagram 200a of FIG. 2a, step 320 of flowchart 300 comprises processor 170 configured to present, on display 102, a plurality of attribute compasses 202, 203, and 204 associated with media item 258 selected from the plurality of media items 257-271. As previously explained, each media item shown in grid view 220a has one or more attribute compasses. The one or more attribute compasses may be determined by the metadata associated with each media item. For example, in FIG. 2a, media item 258 is selected as indicated by media item highlight 230a. The plurality of attribute compasses 202, 203, and 204 are shown in user interface 201a in response to selecting media item 258.

Referring to step 330 of flowchart 300 in FIG. 3 and diagram 200b of FIG. 2, step 330 of flowchart 300 comprises processor 170 configured to designate selected media item 258 as a pivot item upon receiving a selection of attribute compass 202 from the plurality of attribute compasses 202, 203, and 204, attribute compass 202 comprising a positive correlation between a direction and an attribute. As previously discussed, media item 258 is designated a pivot item as soon as one of attribute compasses 202, 203 and 204 of media item 258 is selected. In alternative embodiments, more than one of attribute compasses 202, 203, and 204 may be selected simultaneously.

Referring to step 340 of flowchart 300 in FIG. 3 and diagram 200b of FIG. 2b, step 340 of flowchart 300 comprises processor 170 configured to arrange grid view 220b according to a positive correlation of attribute compass 258. As previously explained, after receiving a selection of attribute compass 202 in step 330, the plurality of media items will be arranged such that the comedy attribute scores towards the right direction of the pivot item will gradually increase. Similarly, another arrangement may be made such that the action attribute scores towards the left direction of the pivot item will gradually increase. Thus, the farther a user navigates to the right of grid view 220b, the more each movie associated with the media item will be focused on comedy. Similarly, the farther a user navigates to the left of grid view 220b, the more each movie associated with the media item will be focused on action.

Accordingly, a system and method for providing a user interface for media navigation by attribute compass for locating a media item relevant to a user's interest has been disclosed. The attribute compasses allows the media items to be arranged such that the user may intuitively know which direction to traverse with respect to the pivot item in order to find media items with greater weight or correlation to a specific attribute. Therefore, the visual layout of the grid view allows a user to bypass examining returned search results in a more time consuming fashion, such as sequentially in a multi-page list. Furthermore, by using various attribute compasses during the navigation, the user is given a continuous browsing experience that allows the user to quickly narrow the field of relevant search results, thereby saving the user from having to spend additional browsing time.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A system providing a user interface for facilitated navigation through a plurality of media items to locate a media item relevant to a user interest, the system comprising:
a processor configured to:
show, on a display, a grid view of the plurality of media items;
receive a selection of a first media item from the plurality of media items;
present, on the display, a first plurality of attribute compasses associated with the first media item;
receive a first user selection of a first attribute compass from the first plurality of attribute compasses, the first attribute compass comprising a first positive correlation between a first direction and a first attribute and a second positive correlation between a second direction and a second attribute, wherein the first direction and the second direction are opposite directions on a common axis, wherein the first media item is a movie, the first attribute is a first movie genre and the second attribute is a second movie genre, and wherein the plurality of media items include first movies in the first direction and second movies in the second direction;
designate the first media item as a pivot item upon receiving the first user selection of the first attribute compass;
arrange the grid view according to the first positive correlation and the second positive correlation of the first attribute compass, wherein as moving farther from the first media item in the first direction, a weight of the first attribute of a next one of the first movies increases and a weight of the second attribute of the next one of the first movies decreases, and wherein as moving farther from the first media item in the second direction, the weight of the second attribute of a next one of the second movies increases and the weight of the first attribute of the next one of the second movies decreases.

2. The system of claim 1, wherein each of the plurality of media items is assigned an attribute score corresponding to the first plurality of attribute compasses, and wherein a difference in the attribute score of each of the plurality of media items to the pivot item is proportional to a distance between the each of the plurality of media items and the pivot item on the grid view.

3. The system of claim 1, wherein the arranging comprises placing the pivot item at a center of the grid view.

4. The system of claim 1, wherein the processor is further configured to:
receive, in response to another selection by the user, another attribute compass from the plurality of attribute compasses, the another attribute compass comprising a third positive correlation between a third direction and a third attribute and a fourth positive correlation between a fourth direction and a fourth attribute, wherein the third direction and the fourth direction are opposite directions; and rearrange the grid view according to the third positive correlation and the fourth positive correlation of the attribute compass, wherein a weight of the third attribute of the plurality of the media items increases in the third direction and a weight of the fourth attribute of the media items decreases in the third direction, wherein the weight of the third attribute of the plurality of the media items decreases in the fourth direction and the weight of the fourth attribute of the media items increases in the fourth direction.

5. The system of claim 1, wherein prior to presenting, the processor is configured to-initially choose the pivot item based on one of an initial user selection, a default selection set in a user profile, a selection based on prior user selections, and a recommendation engine selection.

6. The system of claim 1, wherein the processor is further configured to: present, on the display, an another plurality of attribute compasses associated with another media item selected from the plurality of media items; receive another selection of another attribute compass from the another plurality of attribute compasses, the another attribute compass comprising a third positive correlation between a third direction and a third attribute and a fourth positive correlation between a fourth direction and a fourth attribute, wherein the third direction and the fourth direction are opposite directions, and wherein the processor is further configured to:
designate the another media item as the pivot item upon receiving the another selection of the another attribute compass selected from the another plurality of attribute compasses; and
rearrange the grid view according to the third positive correlation and the fourth positive correlation of the another attribute compass, wherein a weight of the third attribute of the plurality of the media items increases in the third direction and a weight of the fourth attribute of the media items decreases in the third direction, wherein the weight of the third attribute of the plurality of the media items decreases in the fourth direction and the weight of the fourth attribute of the media items increases in the fourth direction.

7. A method for providing a user interface for facilitated navigation through a plurality of media items to locate a media item relevant to a user interest, the method comprising:
showing, on a display, a grid view of the plurality of media items;
receiving a selection of a first media item from the plurality of media items;
presenting, on the display, a first plurality of attribute compasses associated with the first media item;
receiving a first user selection of a first attribute compass from the first plurality of attribute compasses, the first attribute compass comprising a first positive correlation between a first direction and a first attribute and a second positive correlation between a second direction and a second attribute, wherein the first direction and the second direction are opposite directions on a common axis, wherein the first media item is a movie, the first attribute is a first movie genre and the second attribute is a second movie genre, and wherein the plurality of media items include first movies in the first direction and second movies in the second direction;
designating the first media item as a pivot item upon receiving the first user selection of the first attribute compass;

arranging the grid view according to the first positive correlation and the second positive correlation of the first attribute compass, wherein as moving farther from the first media item in the first direction, a weight of the first attribute of a next one of the first movies increases and a weight of the second attribute of the next one of the first movies decreases, and wherein as moving farther from the first media item in the second direction, the weight of the second attribute of a next one of the second movies increases and the weight of the first attribute of the next one of the second movies decreases.

8. The method of claim 7, wherein each of the plurality of media items is assigned an attribute score corresponding to the first plurality of attribute compasses, and wherein a difference in the attribute score of each of the plurality of media items to the pivot item is proportional to a distance between the each of the plurality of media items and the pivot item on the grid view.

9. The method of claim 7, wherein the arranging comprises placing the pivot item at a center of the grid view.

10. The method of claim 7, the method further comprising:
receiving, in response to another selection by the user, the another attribute compass comprising a third positive correlation between a third direction and a third attribute and a fourth positive correlation between a fourth direction and a fourth attribute, wherein the third direction and the fourth direction are opposite directions; and
rearranging the grid view according to the third positive correlation and the fourth positive correlation of the attribute compass, wherein a weight of the third attribute of the plurality of the media items increases in the third direction and a weight of the fourth attribute of the media items decreases in the third direction, wherein the weight of the third attribute of the plurality of the media items decreases in the fourth direction and the weight of the fourth attribute of the media items increases in the fourth direction.

11. The method of claim 7, wherein, prior to presenting, the method comprises initially choosing the pivot item based on one of an initial user selection, a default selection set in a user profile, a selection based on prior user selections, and a recommendation engine selection.

12. The method of claim 7, the method further comprising:
presenting, on the display, an another plurality of attribute compasses associated with another media item selected from the plurality of media items; receiving another selection of another attribute compass from the another plurality of attribute compasses, the another attribute compass comprising a third positive correlation between a third direction and a third attribute and a fourth positive correlation between a fourth direction and a fourth attribute, wherein the third direction and the fourth direction are opposite directions;
designating the another media item as the pivot item upon receiving the another selection of the another attribute compass selected from the another plurality of attribute compasses; and
rearranging the grid view according to the third positive correlation and the fourth positive correlation of the another attribute compass, wherein a weight of the third attribute of the plurality of the media items increases in the third direction and a weight of the fourth attribute of the media items decreases in the third direction, wherein the weight of the third attribute of the plurality of the media items decreases in the fourth direction and the weight of the fourth attribute of the media items increases in the fourth direction.

13. The system of claim 1, wherein determining further comprises dynamically determining at least one common attribute compass corresponding to the plurality of media items.

14. The method of claim 7, wherein determining further comprises dynamically determining at least one common attribute compass corresponding to the plurality of media items.

15. The system of claim 1, wherein the processor is further configured to:
receive a second user selection of a second attribute compass from the first plurality of attribute compasses;
receive a third user selection of a second media item from the plurality of media items;
determine, in response to receiving the third user selection, a second plurality of attribute compasses associated with the second media item, the second plurality of attribute compasses differing from the first plurality of attribute compasses; and
present, on the display, the second plurality of attribute compasses associated with the second media item.

16. The method of claim 7 further comprising:
receiving a second user selection of a second attribute compass from the first plurality of attribute compasses;
receiving a third user selection of a second media item from the plurality of media items;
determining, in response to receiving the third user selection, a second plurality of attribute compasses associated with the second media item, the second plurality of attribute compasses differing from the first plurality of attribute compasses; and
presenting, on the display, the second plurality of attribute compasses associated with the second media item.

17. A method comprising:
showing, on a display, a grid view of the plurality of media items;
receiving a selection of a media item from the plurality of media items;
presenting, on the display, a first plurality of attribute compasses associated with the selected media item;
receiving a first user selection of a first attribute compass from the first plurality of attribute compasses, the first attribute compass comprising a first positive correlation between a first direction and a first attribute and a second positive correlation between a second direction and a second attribute, wherein the first direction and the second direction are opposite directions on a common axis;
arranging the grid view according to the first positive correlation and the second positive correlation of the first attribute compass, wherein the plurality of media items include first media items in the first direction and second media items in the second direction, wherein as moving farther from the selected media item in the first direction, a weight of the first attribute of a next one of the first media items increases and a weight of the second attribute of the next one of the first media items decreases, and wherein as moving farther from the selected media item in the second direction, the weight of the second attribute of a next one of the second media items increases and the weight of the first attribute of the next one of the second media items decreases.

18. The method of claim 17, wherein the first attribute is a first genre and the second attribute is a second genre.

* * * * *